United States Patent [19]
Heismann

[11] Patent Number: 5,212,743
[45] Date of Patent: May 18, 1993

[54] AUTOMATIC POLARIZATION CONTROLLER HAVING BROADBAND, RESET-FREE OPERATION

[75] Inventor: Fred L. Heismann, Freehold, N.J.

[73] Assignee: AT&T Bell Laboratories, Murray Hill, N.J.

[21] Appl. No.: 836,045

[22] Filed: Feb. 12, 1992

[51] Int. Cl.$^5$ .................... G02B 6/12; G02B 5/30
[52] U.S. Cl. ........................ 385/11; 385/14; 385/31; 359/484; 359/494
[58] Field of Search ............. 385/2, 3, 11, 14, 31, 385/39, 28, 40, 129, 130, 132; 359/483, 484, 494, 495, 497

[56] References Cited
U.S. PATENT DOCUMENTS

| | | | |
|---|---|---|---|
| 4,384,760 | 5/1983 | Alferness | 385/11 |
| 4,533,207 | 8/1985 | Alferness | 385/11 |
| 4,606,605 | 8/1986 | Ashkin et al. | 385/11 |
| 4,732,444 | 3/1988 | Papuchon et al. | 385/11 |
| 4,746,191 | 5/1988 | Kawakami et al. | 385/11 |
| 4,898,441 | 2/1990 | Shimizu | 385/11 |
| 4,923,290 | 5/1990 | Brinkmeyer et al. | 385/11 |
| 4,966,431 | 10/1990 | Heismann | 385/11 |
| 4,988,169 | 1/1991 | Walker | 385/11 |
| 5,004,312 | 4/1991 | Shimizu | 385/1 |

Primary Examiner—Brian Healy
Attorney, Agent, or Firm—Gregory C. Ranieri

[57] ABSTRACT

Wide optical bandwidth and broad wavelength tuning range are achieved in a reset-free, optical, automatic polarization controller by combining three controllable fractional wave elements in cascade and further by controlling the orientations of both outermost fractional wave elements to differ by a prescribed angular amount which is maintained substantially constant. The prescribed angular amount is defined to be between 0 and $2\pi$, inclusively. Synchronous control of both outermost fractional wave elements maintains the prescribed angular difference to be maintained constant during operation of the polarization controller. The three fractional wave elements are described as an endlessly rotatable half-wave element and two synchronously rotatable quarter-wave elements wherein the half-wave element is placed between the quarter-wave elements. Each fractional wave element varies the orientation of linear birefringence along its optical wavepath and introduces a specified phase retardation. Embodiments of the polarization controller are realized using either distributed bulk optic devices or integrated electrooptic waveguide devices. Rotation of the elements is afforded by a feedback control circuit which monitors the output optical polarization and derives appropriate electrical drive signals to achieve the proper rotation of the elements.

32 Claims, 4 Drawing Sheets

AUTOMATIC POLARIZATION CONTROLLER HAVING BROADBAND, RESET-FREE OPERATION

TECHNICAL FIELD

This invention relates to devices for controlling polarization of incident optical signals and, more particularly, to devices which permit endless or reset-free operation.

BACKGROUND OF THE INVENTION

Optical fiber communication systems based on fiber other than polarization preserving fiber cause lightwave signals in the fiber to experience random changes in polarization state from one end of the fiber to the other. Fiber birefringence is the cause of the random polarization changes. Random polarization changes are evidenced as fading or loss of the lightwave signal at the receiver because the polarization of the received signal differs from a prescribed or expected polarization.

In order to correct the polarization state of lightwave signals emerging from the optical fiber and, thereby, avoid polarization fading, polarization transformers have been developed to transform the fiber output polarization into the prescribed polarization state for applications such as heterodyne detection and interferometric signal processing. Conventional polarization transformers provide a limited range of birefringence compensation and require a reset cycle when the range is exceeded. Reset cycles give rise to periods of unacceptable data loss. Endless polarization transformers provide continuous control of the polarization state over a virtually infinite range of birefringence compensation.

Endless polarization transformers have been developed using cascaded polarization transformers having a limited transformation range such as fiber squeezers and electrooptic devices using lithium niobate. Fiber squeezers mechanically induce birefringence in the fiber axes to cause retardation between the two orthogonal modes perpendicular and parallel to the direction of pressure. While these cascaded devices permit truly endless (reset free) operation, individual elements within the devices still require occasional reset cycles. Although the reset cycles can be performed without affecting the overall polarization transformation (quasi-endless polarization control), these devices generally fail to permit polarization fluctuations during reset cycles. Moreover, they require sophisticated and even computer controlled drive algorithms for proper operation which, undoubtedly, results in a slow response.

Recently, a reset-free, endless polarization transformer was demonstrated performing general polarization transformations from any arbitrarily varying optical input polarization into any arbitrarily varying optical output polarization by producing adjustable elliptical birefringence of constant total phase retardation in a single-mode waveguide. See U.S. Pat. No. 4,966,431 issued to Heismann on Oct. 30, 1990. A particular transformation is obtained by adjusting the azimuth of linear birefringence and the ratio of linear to circular birefringence. In its integrated-optic realization, the endless polarization transformer includes at least one cascadable transformer section comprising cascaded first and second TE TM mode converters. Phase shifting (TE/TM) is performed in a section between the mode converters, in a section following the mode converters, or both between and following the mode converters. All sections are formed over a birefringent waveguide capable of supporting propagation of TE and TM optical signal modes. While the recent endless, reset-free polarization transformer is cascadable and affords simplicity of design and operation over prior art devices, it cannot be overlooked that this polarization transformer has a relatively narrow optical bandwidth at wavelengths of interest—less than 1 nm at 1.55 $\mu$m—and permits only limited tunability over a small wavelength range—approximately 10 nm.

SUMMARY OF THE INVENTION

Wide optical bandwidth and broad wavelength tuning range are achieved in a reset-free, optical, automatic polarization controller by combining three controllable fractional wave elements in cascade and further by controlling the orientations of both outermost fractional wave elements to differ by a prescribed angular amount which is maintained substantially constant. Synchronous control of both outermost fractional wave elements maintains the prescribed angular difference to be maintained constant during operation of the polarization controller.

In the embodiments described herein, the three fractional wave elements are an endlessly rotatable half-wave element and two synchronously rotatable quarter-wave elements wherein the half-wave element is placed between the quarter-wave elements. Each fractional wave element varies the orientation of linear birefringence along its optical wavepath and introduces a specified phase retardation.

Embodiments of the polarization controller are realized using either distributed bulk optic devices or integrated electrooptic waveguide devices. Rotation of the elements is afforded by a feedback control circuit which monitors the output optical polarization and derives appropriate electrical drive signals to achieve the proper rotation of the elements.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Endless polarization controllers are ideally suited for applications in fiber optic coherent communication systems, where polarization controllers of essentially unlimited (endless) transformation ranges are needed to match the optical polarization states of the local oscillator laser and the received optical signal. The preferred embodiment of the polarization controller utilizes the electrooptic effect and is realized with integrated-optic strip waveguides. It allows general polarization transformations from arbitrarily varying input optical polarization states into any arbitrary output optical polarization state, requiring from the control circuit six drive voltages of limited range depending on two independent variables. Both analog and digital control circuits have been utilized to generate the independent electrical drive signals. The digital control circuit offers the advantage of higher speed operation over the analog control circuit.

An analysis of the operation of a reset-free polarization controller is based on three cascaded endlessly rotatable fractional wave elements: a first quarter-wave plate 10 followed by a half-wave plate 11 and a second quarter-wave plate 12 that is rotated synchronously with the first quarter-wave plate 10. Synchronous operation of the quarter-wave plates 10 and 12 is indicated by dashed line 13. It is shown that, for any arbitrary angular offset between the outermost elements, quarter-wave plates 10 and 12, the controller allows continuous and reset-free transformations from any varying general input state of polarization into any general output state of polarization. It is understood by persons skilled in the art that orientation of the fractional wave elements refers to the angular orientation of the same selected principal axis, either ordinary or extraordinary, with respect to a selected reference direction. The principal axes are contained in a plane which, for each fractional wave element, is perpendicular to the propagation axis of the optical beam through the controller. Dots on each wave plate depict the point at which the propagation axis passes through each wave plate.

Figure 1:
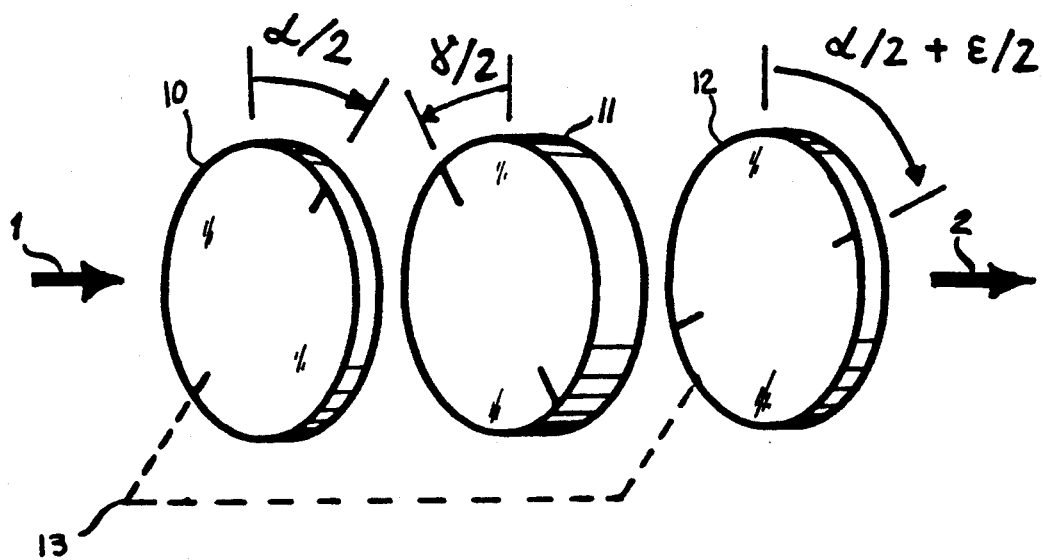
FIG. 1 shows a simplified schematic diagram of the combination of fractional wave elements which are employed in the present invention.

The arrangement shown in FIG. 1 allows general polarization transformations of unlimited range from the varying polarization state of input optical beam 1 to the desired polarization state of output optical beam 2, if all three wave plates 10, 11, and 12 are independently rotatable. In FIG. 1, however, the second quarter-wave plate is rotated synchronously with the first quarter-wave plate, such that their relative orientation is always constant. Hence, the polarization controller permits adjustment of only two independent parameters, namely, the angular orientation of quarter-wave plate 10 indicated as $\alpha/2$ and the angular orientation of center half-wave plate 11 indicated as $\gamma/2$. The angular offset of second quarter-wave plate 12 relative to first quarter-wave plate 12 is indicated as $\epsilon/2$ and can be arbitrary in the range between 0 and $2\pi$. In particular, quarter-wave plate 12 can be angularly oriented parallel to the first quarter-wave plate ($\epsilon=0$). In this case, the entire controller acts like an endlessly rotatable wave plate with endlessly adjustable linear phase retardation. When $\epsilon=\pi$ (crossed quarter-wave plates), the controller acts like a generalized half-wave plate, producing endlessly adjustable elliptical birefringence of constant phase retardation $\pi$.

The arrangement in FIG. 1 is realizable by using bulk optics which are commercially available and are well known to persons skilled in the art. Transducers or electromechanically controlled rotation stages (not shown) for the wave plates are available for varying the angular orientation of each wave plate. A control circuit similiar to the one shown in FIG. 3 can be adapted for use with the wave plates and rotation stages in order to generate control signals for causing rotation of the wave plates and for insuring synchronous rotation of quarter-wave plates 10 and 12.

Figure 2:
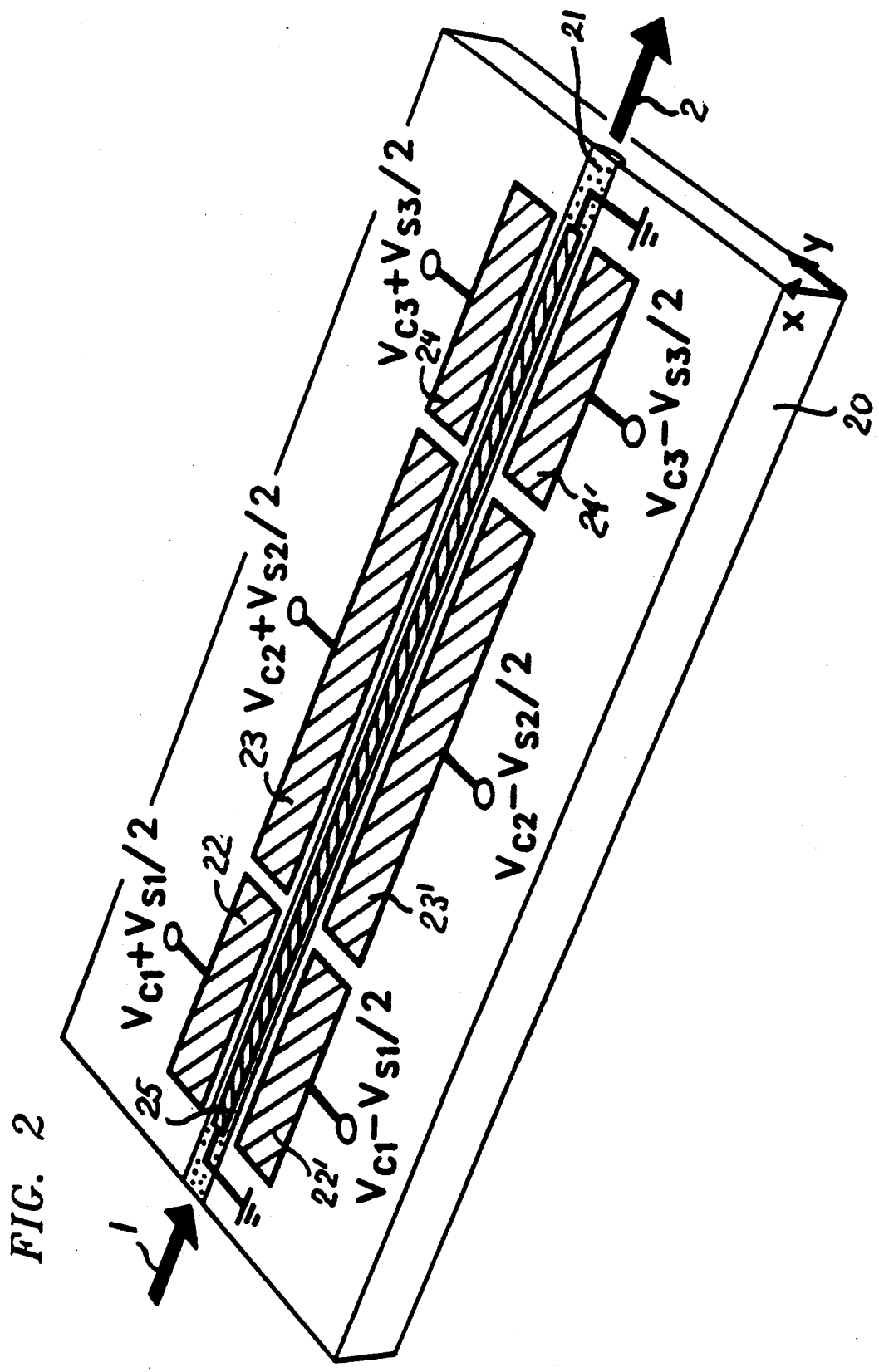
FIG. 2 shows a view of the waveguide and electrode structure for an exemplary embodiment of the controller in FIG. 1.

An integrated-optic realization of the arrangement in FIG. 1 is shown in FIG. 2. The polarization controller is fabricated on a low birefringence, x-cut, z-propagation LiNbO$_3$ substrate 20 and operates with a standard titanium-indiffused, single-mode waveguide 21. It employs three cascaded electrode sections corresponding to the three rotatable fractional wave plates. Each section induces an adjustable combination of TE TM mode conversion and relative TE-TM phase shifting, that is, linear birefringence of variable orientation but constant phase retardation. TE TM mode conversion is accomplished via the r$_{61}$ electrooptic coefficient by applying common drive voltage component V$_{Ci}$, where i=1, 2, or 3, to the section electrode pairs on either side of electrode 25 on top of waveguide 21, namely, electrodes 22—22', electrodes 23—23', and electrodes 24—24', while TE-TM phase shifting is accomplished via the r$_{22}$ and r$_{12}$ electrooptic coefficients by applying opposite drive voltage components V$_{Si}$/2 and $-$V$_{Si}$/2 to the section electrode pairs on either side of electrode 25. Center electrode 25 over waveguide 21 is shown connected to ground. It is understood that the drive voltage components and the ground potential may be applied in different combinations to the three electrodes (e.g., electrodes 22, 22', and 25) in a particular section without departing from the spirit and scope of the invention.

The first electrode section comprising electrodes 22 and 22' and grounded electrode 25 is driven by voltages $$V_{C1}=(V_0/2) \sin \alpha$$

$$V_{S1}=V_T+(V_\pi/2) \cos \alpha.$$

When driven by these voltages, the section of the integrated-optic device acts like a quarter-wave plate oriented at a variable angle $\alpha/2$.

The second electrode section comprising electrodes 23 and 23' and grounded electrode 25 is driven by voltages $$V_{C2}=V_0 \sin \gamma$$

$$V_{S2}=V_T+V_\pi \cos \gamma.$$

When driven by these voltages, the section of the integrated-optic device acts like a half-wave plate oriented at a variable angle $\gamma/2$.

The third electrode section comprising electrodes 24 and 24' together with grounded electrode 25 is driven by voltages $$V_{C3}=(V_0/2) \sin (\alpha+\epsilon)$$

$$V_{S3}=V_T+(V_\pi/2) \cos (\alpha+\epsilon).$$

When driven by these voltages, this section of the integrated-optic device acts like a quarter-wave plate oriented at a variable angle $(\alpha+\epsilon)/2$.

In the equations defining the drive voltages to all three electrode sections described above, V$_0$ denotes the voltage required for complete TE TM mode conversion and V$_\pi$ denoted the voltage for inducing a TE-TM phase shift of $\pi$. Additional bias voltage V$_T$ is applied to compensate for any residual birefringence in the waveguide. In an illustrative example of the polarization controller in operation, the bias voltages were determined as follows $V_0 \approx 19$ V, $V_\pi \approx 26$ V, and $V_T \approx 54$ V where the polarization controller had a length of approximately 5.2 cm.

For practical applications, two special cases $\epsilon = 0$ and $\epsilon = \pi$ are of particular interest. In the first case, both quarter-wave plate sections are driven by the same voltages, $$V_{C3} = V_{C1}$$

$$V_{S3} = V_{S1}$$

whereas in the second case, the two quarter-wave plate sections are essentially driven by voltages of opposite polarities, $$V_{C3} = -V_{C1}$$

$$V_{S3} = -V_{S1} + 2V_T.$$

The following is a more detailed description of the electrooptic operation within the polarization controller. In the crystal orientation of FIG. 2, TE-TM phase shifting is accomplished via the $r_{22}$ and $r_{12}$ electrooptic coefficients ($r_{12} = -r_{22} \approx 3.4 \times 10^{-12}$ m/V) by applying a voltage $V_{Si}$, for $i = 1$, 2, or 3, across the two outer electrodes, which induces an electric field $E_y$ in the waveguide 21. The relative TE-TM phase shift $2\zeta_i$ induced in an electrode section of length $L_i$ is given by $$\zeta_i = \Gamma_y \frac{\pi}{\lambda_o} n_o^3 r_{22} \frac{V_{Si}}{2G + W} L_i,$$

where $\Gamma_y$ is the spatial overlap of the applied electric field $E_y$ with the optic fields ($0 \leq \Gamma_y \leq 1$), $\lambda_o$ the wavelength in free space, $n_o$ the ordinary index of refraction, W is the width of the center electrode, and G the width of the gaps between the center and the outer electrodes.

TE ⇌ TM mode conversion is accomplished via the $r_{61}$ electrooptic coefficient ($r_{61} = -r_{22}$) by applying a voltage $V_{Ci}$ across the center and the side electrodes, which induces a field $E_x$ in the waveguide. The phase retardation $2\eta_i$ for mode conversion induced in an electrode section of length $L_i$ is $$\eta_i = \Gamma_x \frac{\pi}{\lambda_0} n_o^3 r_{61} \frac{V_{Ci}}{G} L_i$$

where $\Gamma_x$ is the spatial overlap of the applied electric field $E_x$ with the optic fields ($0 \leq \Gamma_x \leq 1$). The voltage amplitudes $V_0$ and $V_\pi$ are adjusted such that at the wavelength of operation $-\pi/4 \leq \zeta_i$, $\eta_i \leq \pi/4$ in the two sections of quarter-wave plates, $i = 1,3$, and $-\pi/2 \leq \zeta_2$, $\eta_2 \leq \pi/2$ in the half-wave plate section where $i = 2$.

It follows that the polarization controller can easily be tuned in wavelength over the entire range of single-mode operation by adjusting $V_0$ and $V_\pi$ to the new wavelength of operation. However, complete mode conversion ($\eta_i = \pi/2$) requires identical propagation constants for the TE and TM polarized modes. That is, there is no static birefringence in the waveguide. This can be achieved by propagating the light slightly off the z-axis ($\approx 1°$ in the yz-plane), such that the positive waveguide birefringence is largely compensated for by the negative crystal birefringence. Any remaining small birefringence $\Delta n$ can be reduced further by applying a bias voltage $V_T$ to the phase shifter electrodes to induce a differential index change of exactly opposite sign, i.e., $-\Delta n = \Gamma_y n_o^3 r_{22} V_T / (2G + W)$.

In spite of the fact that the $r_{61}$ coefficient for mode conversion in z-propagation LiNbO$_3$ is only about 12% of the corresponding $r_{51}$ coefficient in y-propagation LiNbO$_3$, it turns out that the voltages required for complete mode conversion are comparable because the overlap parameter $\Gamma_x$ in the z propagation device is substantially larger than the corresponding parameter in a y-propagation device. The voltages for TE-TM phase shifting are also comparable because the effective electrooptic coefficient in z-propagation LiNbO$_3$ is about 30% of that in y-propagation LiNbO$_3$. Typical voltages for a 20 mm (length) electrode section at $\lambda_0 = 1.5$ μm are $V_\pi \approx 25$ V and $V_0 \approx 20$ V.

In practical realizations, slight misalignment of the electrodes may cause cross modulation between the two voltages, i.e., the voltage $V_{Ci}$ not only induces the desired TE ⇌ TM mode conversion but also a small amount of TE-TM phase shifting, and likewise, the voltage $V_{Si}$ may also induce a small amount of undesired TE ⇌ TM mode conversion. This effect causes a deviation from the ideal transfer function and hence leads to increased polarization crosstalk in the output of the transformer. This non-ideal behavior may be compensated for by pre-distorting (mixing) the drive voltages $V_{Ci}$ and $V_{Si}$. But such pre-distortion has not yet proved necessary in operation of the polarization controller.

In the following paragraphs, the transfer function of the polarization controller is derived and it is shown to describe general polarization transformations of unlimited range. For this analysis, it is assumed that the waveguide is lossless and that it supports only the fundamental TE- and TM-polarized modes. By neglecting the lateral mode distributions as well as the common time and space dependent factors, the relative amplitudes and phases of the TE- and TM polarized modes are described by complex numbers $a_1$ and $a_2$, with $|a_1|^2 + |a_2|^2 = 1$. A general state of polarization (state of optical polarization) is then represented by a normalized Jones vector, $$P \begin{pmatrix} a_1 \\ a_2 \end{pmatrix} = \frac{1}{\sqrt{2}} \begin{pmatrix} \cos\theta + j\sin\theta e^{-j\phi} \\ j\cos\theta + \sin\theta e^{-j\phi} \end{pmatrix}$$

where $\theta$ and $\phi$ characterize the relative amplitudes and phases of the left and right circular polarization states, with $0 \leq \theta \leq \pi/2$ and $0 \leq \phi \leq 2\pi$. The transfer function of a quarter-wave plate oriented at an azimuth $\alpha/2$ is described by a Jones matrix, $$Q_a = \frac{1}{\sqrt{2}} \begin{pmatrix} 1 - j\cos\alpha & -j\sin\alpha \\ -j\sin\alpha & 1 + j\cos\alpha \end{pmatrix}$$

and that of a rotatable half-wave plate oriented at an azimuth $\gamma/2$ by, $$H_\gamma = \begin{pmatrix} -j\cos\gamma & -j\sin\gamma \\ -j\sin\gamma & j\cos\gamma \end{pmatrix}$$

The overall transfer matrix of the entire cascade of elements for the controller shown in FIGS. 1 and 2 is then given by $T = Q_{\alpha+\epsilon} \cdot H_\gamma \cdot Q_\alpha$ and calculated as, $$T = \begin{pmatrix} A - jB & -C - jD \\ C - jD & A + jB \end{pmatrix}$$

with $A = -\cos\gamma'\cos(\epsilon/2)$
$B = -\sin\gamma'\sin(\alpha + \epsilon/2)$
$C = -\cos\gamma'\sin(\epsilon/2)$
$D = +\sin\gamma'\cos(\alpha + \epsilon/2)$
$\gamma' = \gamma - \alpha - \epsilon/2$ The matrix T describes general elliptical birefringence, where 2 arc sin B is the total amount of induced linear phase retardation at 0° (TE-TM phase shifting), 2 arc sin D the amount of induced linear phase retardation at 45° (TE TM mode conversion), and 2 arc sin C the amount of circular phase retardation. The total amount of induced elliptical phase retardation $\psi$ is given by $\cos\psi = 2A^2 - 1$.

It can be shown with the latter equations that T describes general transformations from any arbitrary input into any arbitrary output state of optical polarization. Moreover, for any arbitrary offset $\epsilon$, it is found that the transformation range of T is unlimited if $\alpha$ and $\gamma$ are endlessly adjustable. By applying T to a general input state of optical polarization of the form shown above with $\theta_{in}$ and $\phi_{in}$ arbitrary, $\theta_{out}$ and $\phi_{out}$ of the output optical state of optical polarization are given as follows, $$\cos 2\theta_{out} = \cos 2\theta_{in}\cos 2\gamma' + \sin 2\theta_{in}\sin 2\gamma'\sin(\phi_{in} + \alpha)$$

$$\tan\phi_{out} = \frac{Z_{in}(1 - 2\sin^2\gamma'\cos^2\alpha') - X_{in}\sin^2\gamma'\sin 2\alpha' - Y_{in}\sin 2\gamma'\cos\alpha'}{X_{in}(1 - 2\sin^2\gamma'\sin^2\alpha') - Z_{in}\sin^2\gamma'\sin 2\alpha' - Y_{in}\sin 2\gamma'\sin\alpha'}$$

where $\alpha' = \alpha + \epsilon$ and, $X_{in} = \sin 2\theta_{in} \cos(\phi_{in} - \epsilon)$ $Y_{in} = \cos 2\theta_{in}$ $Z_{in} = \sin 2\theta_{in} \sin(\phi_{in} - \epsilon)$.

It follows from the equations immediately above that for any given input state of optical polarization, there exists at least one transformation T that yields the desired output state of optical polarization. The desired transformation is obtained when $\alpha'$ and $\gamma'$ satisfy the conditions, $$\tan\alpha' = \frac{X_{out} - X_{in}}{Z_{out} - Z_{in}}$$

$$\tan\gamma' = \frac{\sqrt{(X_{out} - X_{in})^2 + (Z_{out} - Z_{in})^2}}{Y_{out} + Y_{in}}$$

with $X_{out} = \sin 2\theta_{out}\cos\phi_{out}$
$Y_{out} = \cos 2\theta_{out}$
$Z_{out} = \sin 2\theta_{out}\sin\phi_{out}$ Since these equations describe all possible input and output polarization states, it follows from the latter set of equations immediately above that for any general input state of optical polarization, there exist at least four combinations of $\alpha'$ and $\gamma'$ in the range $0 \leq \alpha'$, $\gamma \leq 2\pi$ that yield the desired general output state of optical polarization. If $\{\alpha',\gamma'\}$ is one such combination, then it is possible to find the other three at $\{\alpha' \pm \pi, -\gamma'\}$, $\{\alpha',\gamma' \pm \pi\}$, and $\{\alpha' \pm \pi, -\gamma' \pm \pi\}$.

This is demonstrated when the optical power transfer from a general input state of optical polarization into a general output state of optical polarization is mapped as a function of $\alpha$ and $\gamma$. Such a mapping clearly displays four absolute maxima where all output power is in the desired output state of optical polarization as well as four absolute minima where all output power is in the undesired cross polarization state. There are no secondary maxima or minima in such a mapping. When the input and/or output state of optical polarization is varied, the four maxima (and minima) change their positions in the parameter space but they always remain absolute maxima (or minima). This unique feature allows automatic polarization stabilization via a simple electronic feedback circuit that searches for maximum output power in the desired output state of optical polarization.

From the equations above it is reasonable to conclude that the transformation range of T is unlimited if $\alpha$ and $\gamma$ are endlessly adjustable. It then follows that the polarization controller allows continuous and reset-free transformations between any two endlessly varying general polarization states.

The transformer of FIG. 2 allows general polarization transformations of infinite range. Moreover, automatic polarization control does not require a sophisticated polarization analyzer. As evident from FIG. 3, the desired values for $\alpha$ and $\gamma$ can be found by simply monitoring the power in the selected output state of optical polarization. Furthermore, the simple drive voltage generation circuitry allows automatic polarization stabilization via an entirely analog or digital electronic feedback circuit. The error signals are derived by dithering $\alpha$ and $\gamma$ independently. The resulting dither in the output state of optical polarization of the polarization controller converts into intensity modulation after the polarization dependent element (or a simple polarizer) and is then detected via phase-sensitive detectors. It is then possible either to maximize or to minimize the output power in the selected output state of optical polarization, depending on the settings of the outputs from the comparators in the phase-sensitive detectors.

This automatic control loop is capable of maintaining the desired output state of optical polarization even in the degenerated cases where the values for $\alpha$ and $\gamma$ are not uniquely determined and hence may fluctuate randomly. For transformations close to the degenerated cases, it has been found that small changes in the input state of optical polarization require large changes in the drive voltages. This is easily verified on the Poincaré sphere. If in the case of $\epsilon = \pi$, for example, the input state of optical polarization traces a small circle centered at the antipode of the output state of optical polarization, then maintenance of the output state of optical polarization requires large changes in $\alpha$ or $\gamma$ independent of how small the radius of the circle is. In the case of $\epsilon = 0$, the same variations in the input state of optical polarization require only small changes in $\alpha$ and $\gamma$. Likewise, if the input state of optical polarization traces a circle around a point having the same longitude as the output state of optical polarization but opposite latitude, then maintaining the output state of optical polarization requires large changes in $\alpha$ or $\gamma$ for a transformer with $\epsilon=0$, but only small changes in $\alpha$ and $\gamma$ for $\epsilon=\tau$.

From the above considerations, it is reasonable to conclude that any polarization transformer with only two independent variables may face situations, in which small changes in the input state of optical polarization require large changes in the control variables. These large changes, which are undesired because they may limit the control speed of the device, could be avoided by employing a third independent control variable, such as $\epsilon$ in the present arrangement, as well as a complicated drive algorithm that constantly analyzes the input state of optical polarization. The substantially simpler drive algorithm for schemes with only two independently adjustable parameters allows much faster polarization control and is therefore preferable.

Figure 3:
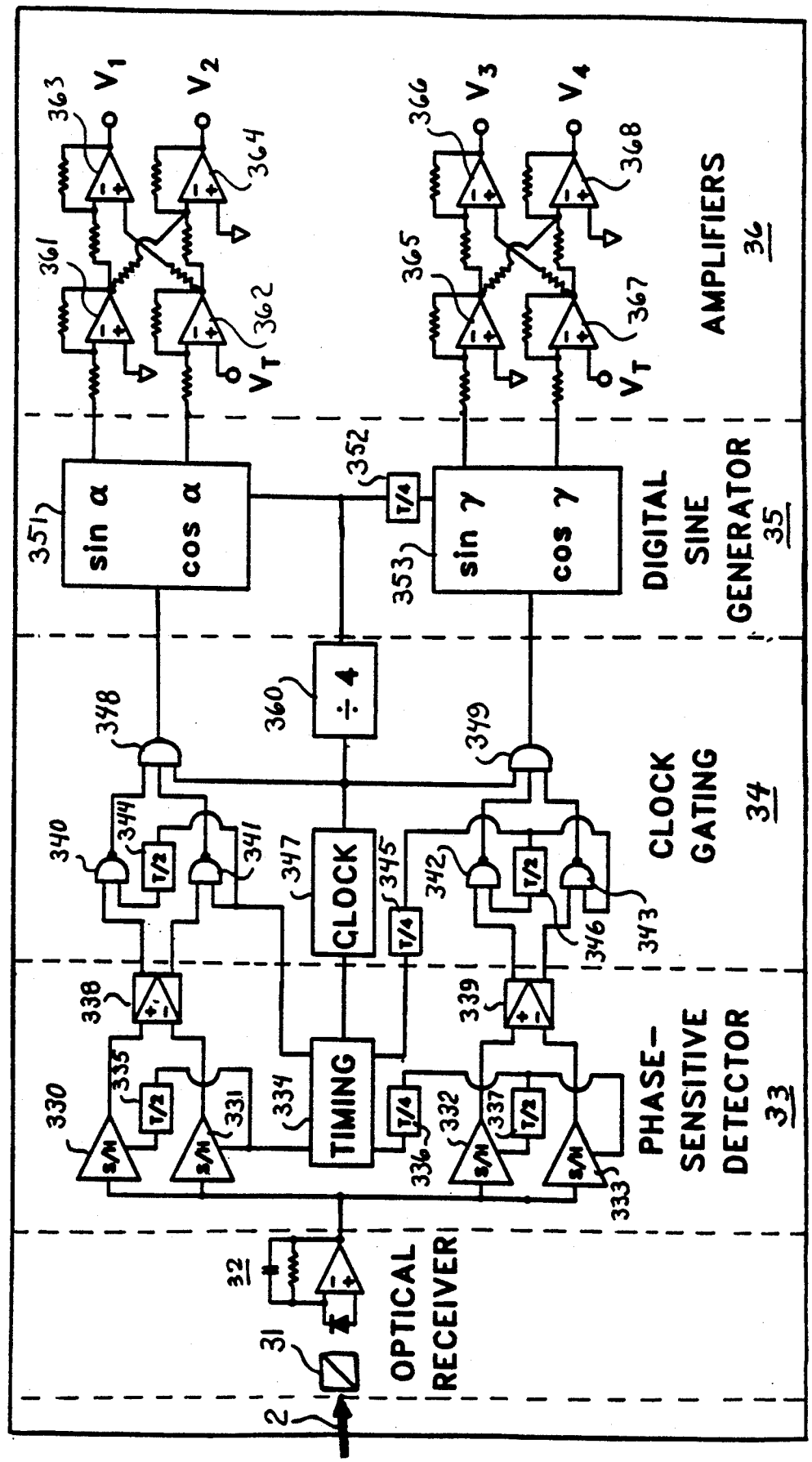
FIG. 3 shows a simplified block diagram of a digital control circuit for use in combination with the polarization controller embodiment of FIG. 2.

In an illustrative embodiment of the polarization controller, a digital control circuit as shown in FIG. 3 is employed to monitor the output optical power in the desired output polarization and to generate the proper drive voltages to achieve polarization control of the polarization of the input optical beam. Moreover, the drive signals generated for both outermost fractional wave elements are generated in a manner to maintain a constant angular offset between the orientations with respect to the same principal axis of both elements. That is, both fractional wave elements are controlled to rotate synchronously so that an offset angle $\epsilon$ is maintained constant between these two elements.

The feedback circuit of FIG. 3 continuously monitors the power in the desired output polarization state using a slow-speed photo-diode and a conventional polarization beam splitter cube as the discriminator. It searches for maximum power in the desired polarization state by dithering the output polarization via $\alpha$ and $\gamma$. This small dither is converted into intensity modulation by the polarization splitter and then analyzed by two phase sensitive detectors, which adjust the drive voltages to minimize the modulation component at the fundamental dither frequency. Polarization beam splitter 31 is used here to allow simultaneous detection of the optical power in the orthogonal cross polarization state. In practical application, splitter 31 may be replaced by a simple polarizer.

As shown in FIG. 3, the digital control circuit includes optical receiver 37, phase sensitive detector 33, clock gating circuit 34, digital sine generator 35 and amplifier 36. Conventions used for the symbols in FIG. 3 are given as follows: S/H stands for sample and hold, T/4 and T/2 stand for time delay elements introducing delays of T/4 time units and T/2 time units, respectively. Drive voltages $V_1$ through $V_4$ are generated by two digital sine-wave synthesizers 351 and 353 in digital sine generator 35 and an array of fast, high-voltage operational amplifiers 361 through 368 in amplifier circuit 36. The synthesizers are arranged to produce pairs of sinusoids (sine and cosine, each of $\alpha$ and $\gamma$) and allow endless adjustment of $\alpha$ and $\gamma$ with a step resolution of 5.6° in this exemplary embodiment. Each pair of sinusoids is generated by a synthesizer (elements 351 or 353) composed of a 64-step digital up-down counter controlled by the outputs of clock gating circuit 34, two read-only memories addressed by the respective counter outputs with look-up tables for the sine and cosine functions, and two digital-to-analog converters to convert the digital amplitude read from the memory into an analog value supplied to amplifiers 36. The size of the look-up table in each synthesizer controls the step resolution of the generated sinusoids. Counters in synthesizers 351 and 353 dither $\alpha$ and $\gamma$ in phase quadrature at a common frequency of 88 kHz (output from the divide-by-4 circuit in clock gating circuit 24) with a peak deviation of 5.6°. Time delay 352 causes voltage adjustments affecting $\alpha$ (drive voltages $V_1$, $V_2$, $V_5$ and $V_6$) to be out of phase with corresponding adjustments affecting $\gamma$ (drive voltages $V_3$ and $V_4$).

Phase-sensitive detector circuit 33 employs four sample-and-hold amplifiers 330–333 followed by analog-to-digital converters (included in the output stage of each sample-and-hold) and digital magnitude comparators 338 and 339. Each portion of the phase sensitive detector circuit 33 re-adjusts $\alpha$ and $\gamma$ in every second dither cycle by one step increment up to a rate of 4300 rad/sec, which is much faster than an analog implementation. Timing element 334 divides the clock from clock generator 347 by an appropriate amount, for example, by 8. Element 334 then reduces the duty cycle of the supplied, divided-down, clock pulses. Clock pulses delivered to the upper phase comparator cause sample and hold 330 to be activated approximately one-half a dither period (T/2, where T is dither period) after sample and hold 331. Comparator 338 compares both sample and hold outputs to determine whether the latest sample is less than, greater than, or equal to, the prior sample. A similar set of operations occurs in the lower portion of the phase sensitive detector. It should be noted that time delay 336 causes sampling in the upper portion of detector 33 to alternate with sampling in the lower portion of detector 33. The sample and hold elements are activated in any given clock period T in the following order: element 331, element 333, element 330, and then element 332. In this manner, the entire digital control circuit corrects $\alpha$ substantially mutually exclusive of corrections to $\gamma$.

Clock gating circuit 34 provides the basic clock signals used in the control circuit as well as gating logic to select the proper correction for $\alpha$ and $\gamma$. Clock gating circuit 34 receives each decision from comparators 338 and 339. Time delays 344, 345, and 346 delay the clock signal from timing circuit 334 so that each NAND gate 340–343 is triggered in a different exclusive time interval. The signal (high speed clock) from clock circuit 347 triggers AND gates 348 and 349 to deliver clock pulses and, if necessary, a correction pulse to the counters in synthesizers 351 and 353, respectively.

Divide-by-4 logic 360 divides the output clock signal from clock circuit 347. Its output is connected to the counters in the synthesizers to define the direction of the count, i.e., up or down. This permits the functions $\sin \alpha$, $\cos \alpha$, $\sin \gamma$ and $\cos \gamma$ to be dithered back and forth within a given dither period.

As the drive voltages to the polarization controller are varied, the controller outputs are received, detected, and compared. But when it is necessary to adjust the drive voltages so that they are dithered about an operating point different from the current operating point, the clock gating circuit causes an additional clock pulse to appear from either gate 348 or 349 or both, depending upon the correction desired. This additional clock pulse causes the corresponding counter to increment or decrement by one. The phase of the signal from element 360 controls incrementing or decrementing of a counter in response to the additional clock pulse.

At the output of amplifier circuit 36, drive voltages $V_1$ through $V_4$ are shown. While not shown, it should be understood by those persons skilled in the art that the additional drive voltages $V_5$ and $V_6$ are easily derived via an amplifier circuit combining $V_1$ with $V_T$ and combining $V_2$ with $V_T$ for a value of $\epsilon = \pi$ resulting in the two outermost sections of the polarization controller being in a crossed position relative to each other. Drive voltages are applied to the electrodes in the following manner: $V_1 = V_{C1} + V_{S1}/2$ applied to electrode 22, $V_2 = V_{C1} - V_{S1}/2$ applied to electrode 22'. $V_3 = V_{C2} + V_{S2}/2$ applied to electrode 23, $V_4 = V_{C2} - V_{S2}/2$ applied to electrode 23', $V_5 = V_{C3} + V_{S3}/2$ applied to electrode 24, and $V_6 = V_{C3} - V_{S3}/2$ applied to electrode 24'. For the crossed orientation of the outermost sections, $V_5 = -V_1 + V_T$ and $V_6 = -V_2 - V_T$. Clearly, this maintains a constant angular offset $\epsilon = \pi$ between the first and third sections of the polarization controller.

For the value of $\epsilon = 0$, the voltages applied to electrodes 22 and 22' are applied to electrodes 24 and 24', respectively. As such, no additional circuitry is required for generating drive voltages $V_5$ and $V_6$. When the value of $\epsilon$ is an arbitrary value, an additional read only memory is required wherein the memory is loaded with an appropriate look-up table for generating the sine and cosine functions for the angle $(\alpha + \epsilon)$. The output from such a memory is supplied to an amplifier circuit similar to the ones shown in amplifier 36 for generating drive voltage $V_5$ and $V_6$.

To measure the response time of the entire control system, the feedback circuit is turned off and the input polarization of the controller is adjusted such that all output light is in the undesired cross polarization state. When the feedback circuit is turned on, it takes the polarization controller with its control circuit less than 500 μsec to induce the $\pi$ phase retardation required to transform the output optical beam into the desired polarization state. It is noted that the induced phase retardation changes linearly with time at a rate of 6300 rad/sec, which is more than 100 times faster than any previously reported speed. As a result of the polarization dither, about 2.5% of the output light remains in the undesired orthogonal cross polarization state. This level can thus be reduced at the expense of control speed by decreasing the step increments in the sine-wave synthesizers.

Figure 4:
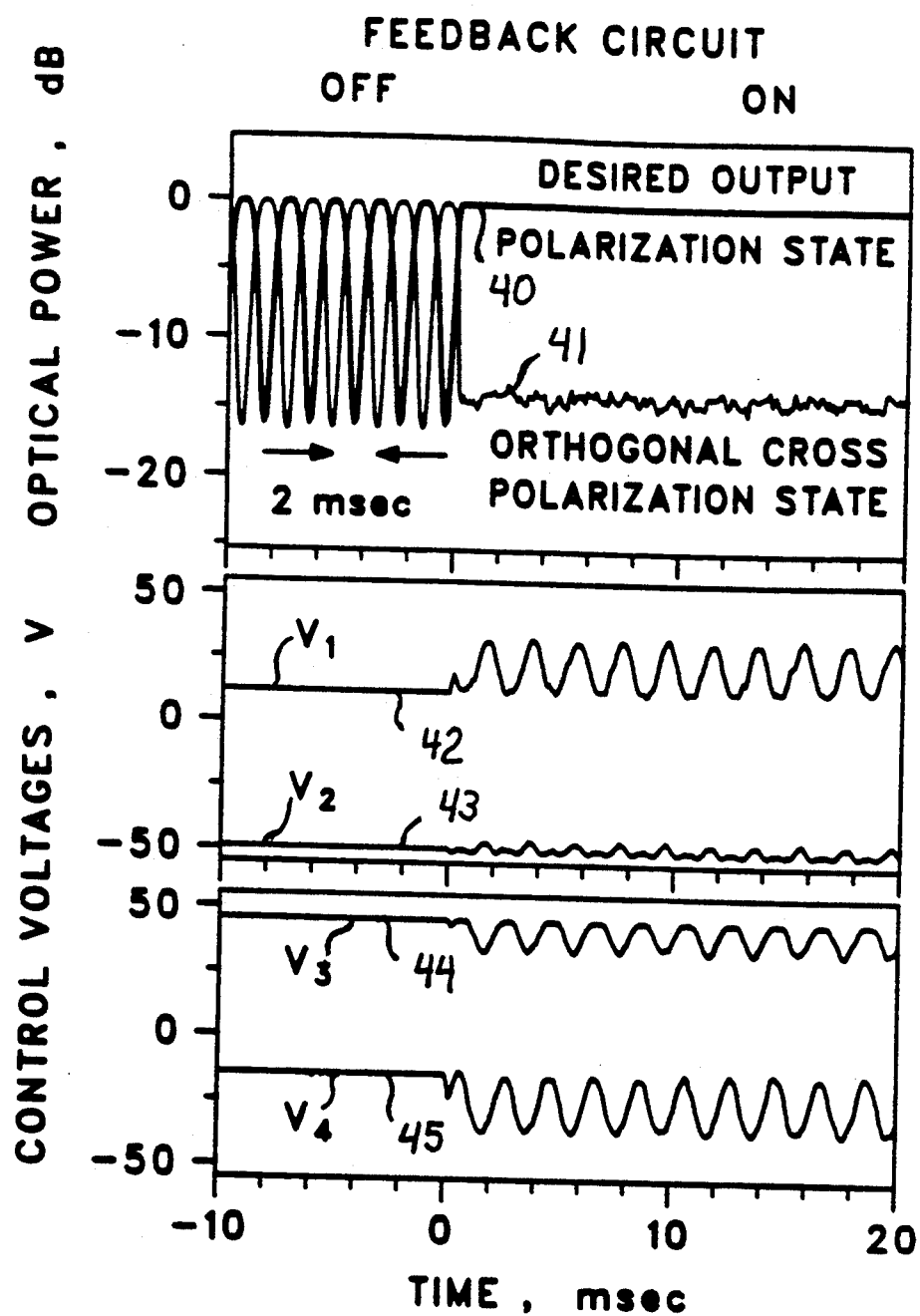
FIG. 4 shows the optical power for the optical polarization states output by the controller in FIG. 2 and it further shows a related series of plots for the electrical drive signals generated by the control circuit in FIG. 3 for controlling the continuously varying optical input polarization state.

An example of automatic continuous stabilization (control) of a rapidly fluctuating optical polarization state is shown in FIG. 4. Here, the feedback circuit is initially turned off, as shown in FIG. 4 under the heading labelled "OFF" to demonstrate the large and fast changes in the input polarization state of the controller, which are generated by a second $LiNbO_3$ polarization transformer and which fluctuate periodically at rates of up to 4900 rad/sec. With the feedback circuit turned on, the controller automatically stabilizes the output polarization state and maximizes the optical power in the desired polarization state 40, as shown in FIG. 4 under the heading labelled "ON." About 4% of the output light is in the orthogonal cross polarization state 41, which is slightly higher than for a slowly varying input polarization state because the feedback circuit operates close to its speed limit. The corresponding drive voltages $V_1$ through $V_4$ are shown as curves 42 through 45, respectively, in FIG. 4. Curves 42 to 45 clearly show the periodic variations in the voltages under automatic control. The periodic dither in the voltages with the exemplary dither period of 11 μsec is too fast and too small to be resolved in curves 42 to 45.

For the exemplary controller shown in FIG. 2 in combination with the feedback control circuit shown in FIG. 3, the measured optical bandwidth was estimated at approximately 50 mm with a wavelength tuning range greater than 100 nm. Optical bandwidth and wavelength tuning range are effected by adjustments to the drive voltage components $V_0$ and $V_\pi$.

In the description above, the illustrative embodiment were depicted using zero-order fractional wave elements. It should now be understood by those persons skilled in the art that higher order fractional wave elements may be substituted for the zero-order fractional wave elements. Higher order quarter-wave elements provide phase retardation proportional to $(2n+1)\pi/2$ while higher order half-wave elements provide phase retardation proportional to $(2m+1)\pi/2$, where m and n are positive integers greater than zero. Any combination of zero order and higher order elements is contemplated. With respect to the nominal operational wavelength for the polarization controller, it is understood by persons skilled in the art how to design the waveguide in the controller for guiding optical beams at wavelengths other than the exemplary wavelength described above. It is further understood by persons skilled in the art that, while a titanium-indiffused waveguide structure for a lithium niobate controller is the preferred design, other waveguide formations are contemplated and other substrates are contemplated including but not limited to semiconductor materials and lithium tantalate, for example.

What is claimed is:

1. A polarization transformer for controlling polarization and phase of an optical signal propagating in a waveguide having an electrooptically induced birefringence at a desired wavelength of operation, the polarization transformer comprising, first means for varying the orientation of linear birefringence of the waveguide and for introducing a first predetermined phase retardation between orthogonal first and second polarization states of the optical signal wherein the first predetermined phase retardation is substantially equal to $\pi/2$ radians when at least one the polarization states is substantially parallel to at least one of the principal axes of the linear birefringence, second means coupled to the waveguide at an output of the first means for varying the orientation of linear birefringence of the waveguide and for introducing a second predetermined phase retardation between orthogonal first and second polarization states of the optical signal wherein the second predetermined phase retardation is substantially equal to $\pi$ radians when at least one the polarization states is substantially parallel to at least one of the principal axes of the linear birefringence, and third means coupled to the waveguide at an output of the second means for varying the orientation of linear birefringence of the waveguide and for introducing a third predetermined phase retardation between orthogonal first and second polarization states of the optical signal wherein the third predetermined phase retardation is substantially equal to $\pi/2$ radians when at least one of the polarization states is substantially parallel to at least one of the principal axes of the linear birefringence, wherein an angular difference ε exists between the orientation of linear birefringence for the first means and the orientation of linear birefringence for the third means and $0 \leq \epsilon \leq 2\pi$.

2. The polarization transformer as defined in claim 1 wherein the angular difference ε is substantially equal to 0.

3. The polarization transformer as defined in claim 1 wherein the angular difference ε is substantially equal to π.

4. A polarization transformer for controlling polarization and phase of an optical signal propagating in a waveguide having an electrooptically induced birefringence at a desired wavelength of operation, the polarization transformer comprising, first means for varying the orientation of linear birefringence of the waveguide and for introducing a first predetermined phase retardation between orthogonal first and second polarization states of the optical signal wherein the first predetermined phase retardation is substantially equal to π/2 radians when at least one the polarization states is substantially parallel to at least one of the principal axes of the linear birefringence.

second means coupled to the waveguide at an output of the first means for varying the orientation of linear birefringence of the waveguide and for introducing a second predetermined phase retardation between orthogonal first and second polarization states of the optical signal wherein the second predetermined phase retardation is substantially equal to π radians when at least one the polarization states is substantially parallel to at least one of the principal axes of the linear birefringence, third means coupled to the waveguide at an output of the second means for varying the orientation of linear birefringence of the waveguide and for introducing a third predetermined phase retardation between orthogonal first and second polarization states of the optical signal wherein the third predetermined phase retardation is substantially equal to π/2 radians when at least one of the polarization states is substantially parallel to at least one of the principal axes of the linear birefringence, and control means coupled at least to the first and third means for maintaining a substantially constant angular difference ε between the orientation of linear birefringence for the first means and the orientation of linear birefringence for the third means wherein $0 \leq \epsilon \leq 2\pi$.

5. The polarization transformer as defined in claim 4 wherein the angular difference ε is substantially equal to 0.

6. The polarization transformer as defined in claim 4 wherein the angular difference ε is substantially equal to π.

7. The polarization transformer as defined in claim 4 wherein the control means includes means for dithering synchronously the orientations of linear birefringence in the first and third means during first time intervals and wherein the control means is coupled to the second means for dithering the orientation of linear birefringence therein during second time intervals, the first time intervals being substantially mutually exclusive of the second time intervals.

8. The polarization transformer as defined in claim 7 wherein the control means dithers the orientations of linear birefringence of the first, second, and third means in a periodic manner at substantially equal dither frequencies so that changes in orientation of linear birefringence for the first and third means occurs in a quadrature phase relationship with changes in orientation of linear birefringence for the second means.

9. A polarization transformer for controlling polarization and phase of an optical signal propagating along a wavepath having an controllable birefringence at a desired wavelength of operation, the polarization transformer comprising first, second, and third means connected in cascade, each means for varying the orientation of linear birefringence of the wavepath and for introducing a predetermined phase retardation between orthogonal first and second polarization states of the optical signal, the predetermined phase retardation of the first means is substantially equal to π/2 radians when at least one the polarization states is substantially parallel to at least one of the principal axes of the linear birefringence for the first means, the predetermined phase retardation of the second means is substantially equal to π radians when at least one the polarization states is substantially parallel to at least one of the principal axes of the linear birefringence for the second means, the third predetermined phase retardation for the third means is substantially equal to π/2 radians when at least one of the polarization states is substantially equal to π/2 radians when at least one of the polarization states is substantially parallel to at least one of the principal axes of the linear birefringence for the third means, and control means coupled at least to the first and third means for maintaining a substantially constant angular difference ε between the orientation of linear birefringence for the first means and the orientation of linear birefringence for the third means wherein $0 \leq \epsilon \leq 2\pi$.

10. The polarization transformer as defined in claim 9 wherein the first and third means each include a bulk optic quarter-wave plate element and the second means includes a bulk optic half-wave plate element.

11. The polarization transformer as defined in claim 10 wherein the control means includes means for rotating the quarter-wave plate elements of the first and third means in synchronism.

12. The polarization transformer as defined in claim 9 wherein the angular difference ε is substantially equal to 0.

13. The polarization transformer as defined in claim 9 wherein the angular difference ε is substantially equal to π.

14. The polarization transformer as defined in claim 9 wherein the control means includes means for dithering synchronously the orientations of linear birefringence in the first and third means during first time intervals and wherein the control means is coupled to the second means for dithering the orientation of linear birefringence therein during second time intervals, the first time intervals being substantially mutually exclusive of the second time intervals.

15. The polarization transformer as defined in claim 14 wherein the control means dithers the orientations of linear birefringence of the first, second, and third means in a periodic manner at substantially equal dither frequencies so that changes in orientation of linear birefringence for the first and third means occurs in a quadrature phase relationship with changes in orientation of linear birefringence for the second means.

16. A polarization transformer for controlling polarization and phase of an optical signal propagating in a waveguide having an electrooptically induced birefringence at a desired wavelength of operation, the polarization transformer comprising, first means for varying the orientation of linear birefringence of the waveguide and for introducing a first predetermined phase retardation between orthogonal first and second polarization states of the optical signal wherein the first predetermined phase retardation is substantially equal to $(2m+1)\pi/2$ radians when at least one the polarization states is substantially parallel to at least one of the principal axes of the linear birefringence, second means coupled to the waveguide at an output of the first means for varying the orientation of linear birefringence of the waveguide and for introducing a second predetermined phase retardation between orthogonal first and second polarization states of the optical signal wherein the second predetermined phase retardation is substantially equal to $(2n+1)\pi$ radians when at least one the polarization states is substantially parallel to at least one of the principal axes of the linear birefringence, and third means coupled to the waveguide at an output of the second means for varying the orientation of linear birefringence of the waveguide and for introducing a third predetermined phase retardation between orthogonal first and second polarization states of the optical signal wherein the third predetermined phase retardation is substantially equal to $(2p+1)\pi/2$ radians when at least one of the polarization states is substantially parallel to at least one of the principal axes of the linear birefringence, wherein n, m, and p are integers greater than or equal to zero and wherein an angular difference $\epsilon$ exists between the orientation of linear birefringence for the first means and the orientation of linear birefringence for the third means and $0 \leq \epsilon \leq 2\pi$.

17. The polarization transformer as defined in claim 16 wherein the angular difference $\epsilon$ is substantially equal to 0.

18. The polarization transformer as defined in claim 16 wherein the angular difference $\epsilon$ is substantially equal to $\pi$.

19. The polarization transformer as defined in claim 16 wherein the control means includes means for dithering synchronously the orientations of linear birefringence in the first and third means during first time intervals and wherein the control means is coupled to the second means for dithering the orientation of linear birefringence therein during second time intervals, the first time intervals being substantially mutually exclusive of the second time intervals.

20. The polarization transformer as defined in claim 19 wherein the control means dithers the orientations of linear birefringence of the first, second, and third means in a periodic manner at substantially equal dither frequencies so that changes in orientation of linear birefringence for the first and third means occurs in a quadrature phase relationship with changes in orientation of linear birefringence for the second means.

21. A polarization transformer for controlling polarization and phase of an optical signal propagating in a waveguide having an electrooptically induced birefringence at a desired wavelength of operation, the polarization transformer comprising, first means for varying the orientation of linear birefringence of the waveguide and for introducing a first predetermined phase retardation between orthogonal first and second polarization states of the optical signal wherein the first predetermined phase retardation is substantially equal to $(2n+1)\pi/2$ radians when at least one the polarization states is substantially parallel to at least one of the principal axes of the linear birefringence, second means coupled to the waveguide at an output of the first means for varying the orientation of linear birefringence of the waveguide and for introducing a second predetermined phase retardation between orthogonal first and second polarization states of the optical signal wherein the second predetermined phase retardation is substantially equal to $(2n+1)\pi$ radians when at least one the polarization states is substantially parallel to at least one of the principal axes of the linear birefringence, third means coupled to the waveguide at an output of the second means for varying the orientation of linear birefringence of the waveguide and for introducing a third predetermined phase retardation between orthogonal first and second polarization states of the optical signal wherein the third predetermined phase retardation is substantially equal to $(2p+1)\pi/2$ radians when at least one of the polarization states is substantially parallel to at least one of the principal axes of the linear birefringence, wherein m, n, and p are integers greater than or equal to zero, and control means coupled at least to the first and third means for maintaining a substantially constant angular difference $\epsilon$ between the orientation of linear birefringence for the first means and the orientation of linear birefringence for the third means wherein $0 \leq \epsilon \leq 2\pi$.

22. The polarization transformer as defined in claim 21 wherein the angular difference $\epsilon$ is substantially equal to 0.

23. The polarization transformer as defined in claim 21 wherein the angular difference $\epsilon$ is substantially equal to $\pi$.

24. The polarization transformer as defined in claim 21 wherein the control means includes means for dithering synchronously the orientations of linear birefringence in the first and third means during first time intervals and wherein the control means is coupled to the second means for dithering the orientation of linear birefringence therein during second time intervals, the first time intervals being substantially mutually exclusive of the second time intervals.

25. The polarization transformer as defined in claim 24 wherein the control means dithers the orientations of linear birefringence of the first, second, and third means in a periodic manner at substantially equal dither frequencies so that changes in orientation of linear birefringence for the first and third means occurs in a quadrature phase relationship with changes in orientation of linear birefringence for the second means.

26. A polarization transformer for controlling polarization and phase of an optical signal propagating along a wavepath having an controllable birefringence at a desired wavelength of operation, the polarization transformer comprising first, second, and third means connected in cascade, each means for varying the orientation of linear birefringence of the wavepath and for introducing a predetermined phase retardation between orthogonal first and second polarization states of the optical signal, the predetermined phase retardation of the first means is substantially equal to $(2n+1)\pi/2$ radians when at least one the polarization states is substantially parallel to at least one of the principal axes of the linear birefringence for the first means, the predetermined phase retardation of the second means is substantially equal to $(2m+1)\pi$ radians when at least one the polarization states is substantially parallel to at least one of the principal axes of the linear birefringence for the second means, the third predetermined phase retardation for the third means is substantially equal to $(2p+1)\pi/2$ radians when at least one of the polarization states is substantially parallel to at least one of the principal axes of the linear birefringence for the third means, wherein m, n, and p are integers greater than or equal to zero, and control means coupled at least to the first and third means for maintaining a substantially constant angular difference $\epsilon$ between the orientation of linear birefringence for the first means and the orientation of linear birefringence for the third means wherein $0 \leq \epsilon \leq 2\pi$.

27. The polarization transformer as defined in claim 26 wherein the first and third means each include a bulk optic quarter-wave plate element and the second means includes a bulk optic half-wave plate element.

28. The polarization transformer as defined in claim 27 wherein the control means includes means for rotating the quarter-wave plate elements of the first and third means in synchronism.

29. The polarization transformer as defined in claim 27 wherein the angular difference $\epsilon$ is substantially equal to 0.

30. The polarization transformer as defined in claim 26 wherein the angular difference $\epsilon$ is substantially equal to $\pi$.

31. The polarization transformer as defined in claim 26 wherein the control means includes means for dithering synchronously the orientations of linear birefringence in the first and third means during first time intervals and wherein the control means is coupled to the second means for dithering the orientation of linear birefringence therein during second time intervals, the first time intervals being substantially mutually exclusive of the second time intervals.

32. The polarization transformer as defined in claim 31 wherein the control means dithers the orientations of linear birefringence of the first, second, and third means in a periodic manner at substantially equal dither frequencies so that changes in orientation of linear birefringence for the first and third means occurs in a quadrature phase relationship with changes in orientation of linear birefringence for the second means.

* * * * *